Oct. 8, 1935. H. M. TAYLOR 2,016,756
TIRE CHAIN CONNECTING DEVICE
Filed May 15, 1933
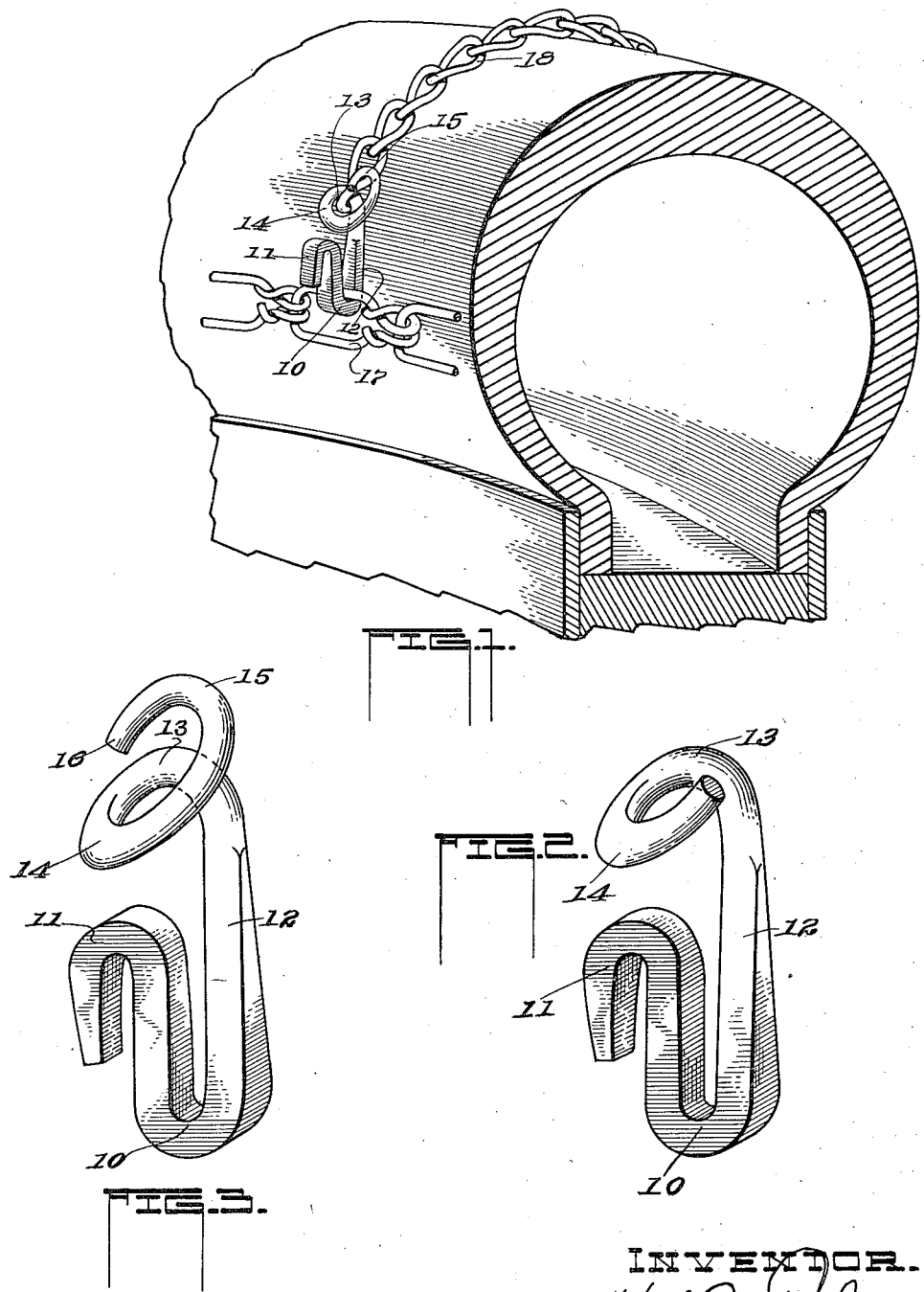

Patented Oct. 8, 1935

2,016,756

UNITED STATES PATENT OFFICE 2,016,756

TIRE CHAIN CONNECTING DEVICE

Hurley M. Taylor, Bloomington, Ill.

Application May 15, 1933, Serial No. 671,036

3 Claims. (Cl. 59—93)

This invention relates to hooks or fastening devices for tire chain cross links and has for its main object the provision of hooks for cross chains having a novel form whereby the cross chains may be quickly and conveniently attached to a spreader chain without use of special tools.

Another object is to provide hooks of the class described, the form of which is such that when the hooks are attached to the spreader chain, they cannot be accidentally removed therefrom through any condition arising through practical use.

A further object lies in the provision of hooks which may be attached to cross chains and spreader chains to form efficient connector means therebetween without necessity of bending, spreading or otherwise distorting either hooks or chains.

Other objects will appear in the following description and accompanying drawing in which—

Fig. 1 is a perspective view of the hook as it would appear assembled with cross and spreader chains with the assembly conventionally mounted upon a tire;

Fig. 2 is a perspective view of a hook having a form which will be described; and Fig. 3 is a perspective view of the same having an elaborated form which will be described.

Before proceeding with the description of this invention, it may be in order to state that the applicant is aware of a number of existing devices intended for attachment of cross and spreader chains, however, in the case of most, if not all, of these devices, conventional or special supplementary tools are required for the work of attaching them for practical use, or snap or other retaining means are required to insure that the hooks do not become detached when subjected to the multitudinous movements peculiar to practical operation of such devices. Also, it may be borne in mind that devices of this class are quite frequently covered with mud, or ice and are at all times subject to rapid corrosion, all of which unfavorable conditions tend to discourage the use of spring or other intricate or delicate means of retaining the hook portions in proper position relative to the chains.

Simple hooks have suggested themselves, but experience has taught that simple hooks are not practicable, as the movements to which such devices are subjected tend to unhook them, either from the spreader chain or cross chain. Obviously, this tendency makes the use of simple hooks, that is, those having no special means for retaining them in hooked relation, quite unsatisfactory, while spring or other intricate retaining means, in the presence of mud, ice or corrosion, as above noted, are often difficult or impossible to manipulate.

Therefore, it may be stated that the present invention provides a means, as will be described, for accomplishing the attachment of cross and spreader chains, the means comprising a hook having the advantages of simplicity, absence of spring or other delicate parts, ruggedness and facility of manipulation, without the disadvantage of possible accidental detachment.

Referring to the drawing, Fig. 3 illustrates a form of my hook, the same having a lower portion comprising a hook portion 10, the lip of which extends upwardly a certain distance and is fashioned to form a secondary reversed hook 11, both hooks being formed upon a common plane.

The shank portion 12 of hook 10 extends upwardly to form the shank of an upper hook 13, the lip of which is shaped to follow a curve extending downwardly and away from the plane of hook 13 and hooks 10 and 11 in such a manner as to permit the formation of a second hooked or curved, off-central portion 14, a further extension and fashioning resulting in formation of a third hook portion 15, the lip 16 of which extends downwardly toward hooks 10 and 11, a certain distance, as shown, and substantially parallel with the connecting portion between hooks 13 and 14.

The drawing clearly indicates that the body portion of which the hooks 10 and 11 are formed may be of substantially square or oblong cross section, while the upper portion including hooks 13, 14 and 15 may be of substantially circular section. The particular sectional form shown represents a convenient form which may be used. However, the form shown is for descriptive purposes only. Obviously, my hook may be made from material having cross section of various forms and therefore I do not wish to be limited to the particular form shown.

Fig. 2 illustrates a modified form of the hook, the same having a form similar to that shown in Fig. 3 with the exception that the third hook portion 15 of Fig. 3 is absent. Like numbers are used to designate like portions in the two views.

Referring to Fig. 1, it will be apparent that in order to attach the hook to a spreader chain, the link, such as is here designated 17, must be first manipulated around and over hook portion 11 before it can be finally seated in hook portion 10.

Likewise, the end link of the cross chain 18 must be manipulated around and about the convolutions of hooks 15 and 14 before being finally seated in hook 13.

To separate the hook and chains manipulation in the opposite order is required. Obviously, the particular movements and sequence thereof required to unhook the parts cannot be duplicated by any movement brought about by practical use. Even though a cross chain such as 18 should break, the hooks cannot be lost from the spreader chain for the reason that neither chains nor hooks can follow the particular unhooking movement required without suitable manipulation.

Separation of the hook from the side chain is prevented by means of the peculiar conformity of hooks 10 and 11.

In the case of breakage of the cross chain above noted, the side chain 17 obviously remains associated with the tire wall. The upper part of the hook being free, it can move in all directions within or upon the link 17 save in the direction of the tire wall.

The specific movements required to attach a hook to a spreader chain have already been explained. If it is now considered that the assembly is associated with a tire as shown in Fig. 1, the cross chain obviously prevents movement of the hook in the reverse order to detach it.

With the cross chain removed, the hook 10 may rotate outwardly upon the cross chain wire but inward back movement, necessary to unhook it, is prevented by both the tire wall and the reverse hook 11 which would engage the lower wire of the link 17.

Other possible movements of the hook relative to the link are not effective to separate the hook as it cannot be separated otherwise than by reverse order of the specific movement, required to attach it.

The form of hook shown in Fig. 3, having the more complicated cross chain hook form is more suitable for use in connection with pneumatic tires which are likely to be considerably distorted at the point of contact with the road, with consequent extensive loosening of the cross chain and hooks, at which time the tendency to unhook is greatest.

The cross chain hook form shown in Fig. 2 having the less complicated hook is suitable for use in connection with solid tires. Since a solid tires is less distorted at the point of contact with the road than is the case with pneumatic tires, the loosening effect in the case of solid tires is considerably less. Therefore, a hook having the simpler form shown in Fig. 2 is considered suitable for use under certain conditions as determined by experience in practical operation.

What I claim is:

1. A tire chain connecting device having a shank and hooks formed upon both ends thereof, the hooks at one end being formed upon a substantially helical line, the hooks at the opposite end being formed upon an undulatory line progressing away from the shank in a plane passing longitudinally through the shank, the hooks adjoining the shank at opposite ends thereof extending toward each other on the same side of the shank.

2. A tire chain connecting device having a shank and hooks formed upon both ends thereof, the hooks at one end being formed upon a substantially helical line, the material thereof having a rounded cross section, the hooks at the opposite end being formed upon an undulatory line progressing away from the shank in a plane passing longitudinally through the shank, the material thereof having a rectangular cross section the hooks adjoining the shank at opposite ends thereof extending toward each other on the same side of the shank.

3. A tire chain connecting device comprising a shank having hooks formed at both ends thereof the hooks of at least one end being formed upon an undulatory line progressing away from the shank and lying in a plane passing longitudinally through the shank.

HURLEY M. TAYLOR.